(12) United States Patent
Hansell et al.

(10) Patent No.: US 7,494,736 B2
(45) Date of Patent: Feb. 24, 2009

(54) DIELECTRIC FRAME ASSEMBLY AND FUEL CELL MANIFOLD

(75) Inventors: Eric Hansell, New Milford, CT (US); Dana A. Kelley, New Milford, CT (US); Mohammad Farooque, Danbury, CT (US); Kevin Dickson, Waterbury, CT (US); Paul Gilbert, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 794 days.

(21) Appl. No.: 11/020,592

(22) Filed: Dec. 23, 2004

(65) Prior Publication Data

US 2006/0141325 A1 Jun. 29, 2006

(51) Int. Cl.
*H01M 2/14* (2006.01)

(52) U.S. Cl. .............................. 429/38; 429/34; 429/35

(58) Field of Classification Search .................. 429/34, 429/35, 38; 279/2.15, 9.1, 19.6
See application file for complete search history.

(56) References Cited

U.S. PATENT DOCUMENTS

| 4,414,294 | A | * | 11/1983 | Guthrie | 429/35 |
| 5,403,132 | A | * | 4/1995 | Truesdell | 409/131 |
| 6,070,911 | A | | 6/2000 | Namikawa et al. | |
| 6,531,237 | B2 | | 3/2003 | Kelley et al. | |
| 2003/0124409 | A1 | * | 7/2003 | Cramer et al. | 429/37 |
| 2005/0058872 | A1 | * | 3/2005 | Blanchet et al. | 429/32 |

* cited by examiner

*Primary Examiner*—Patrick Ryan
*Assistant Examiner*—Ben Lewis
(74) *Attorney, Agent, or Firm*—Cowan, Liebowitz & Latman, P.C.

(57) ABSTRACT

An assembly having a dielectric frame which utilizes a plurality of segments, each segment having opposing first and second surfaces and first and second ends portions. Each of the first and second end portions has an end surface and a cutout extending from the end surface of the end portion along the length of the segment and from the first surface to the second surface. The segments of the frame are arranged in abutting relationship with the first surfaces of the segments aligned and the second surfaces of said segments aligned and with the end surface of a first end portion of a segment abutting the end surface of the second end portion of the adjacent segment. In this way, the cutouts of the first and second end portions of abutting segments form a keyway and a key is situated in the keyway so as to hold the abutting segments together.

In accordance with the invention, certain of the segments are provided with recesses in the first surfaces of the segments adjacent the cutouts. Preferably, the recesses are formed as slanting or inclined surfaces which slant or incline into the thickness of the segment and are adjacent to and end at the far end of the slot, i.e., the end of the slot farthest along length of the segment.

48 Claims, 10 Drawing Sheets

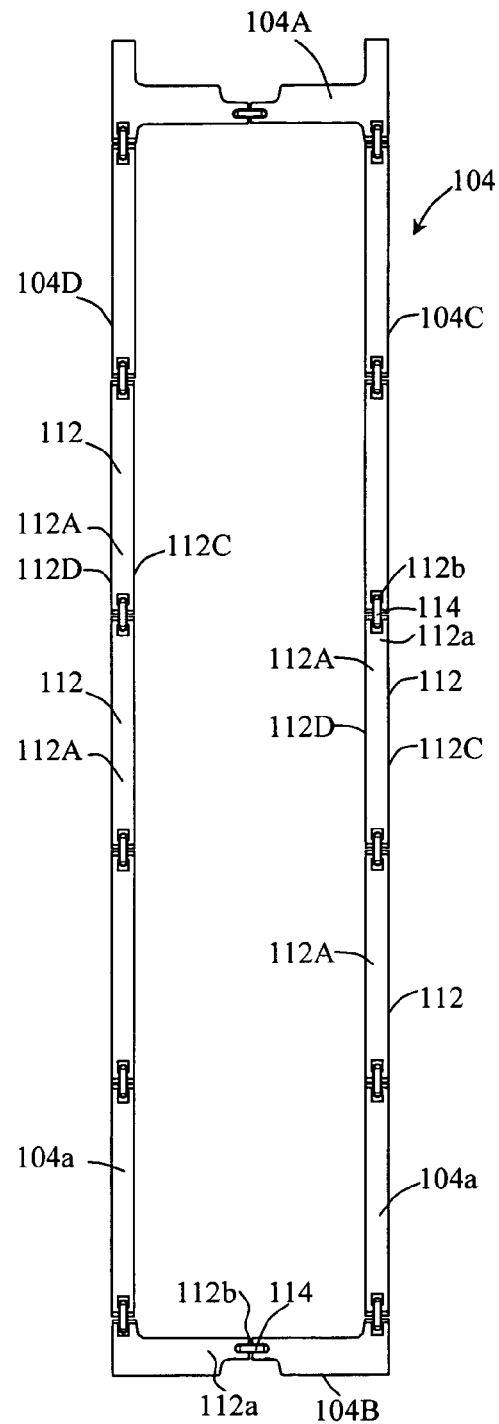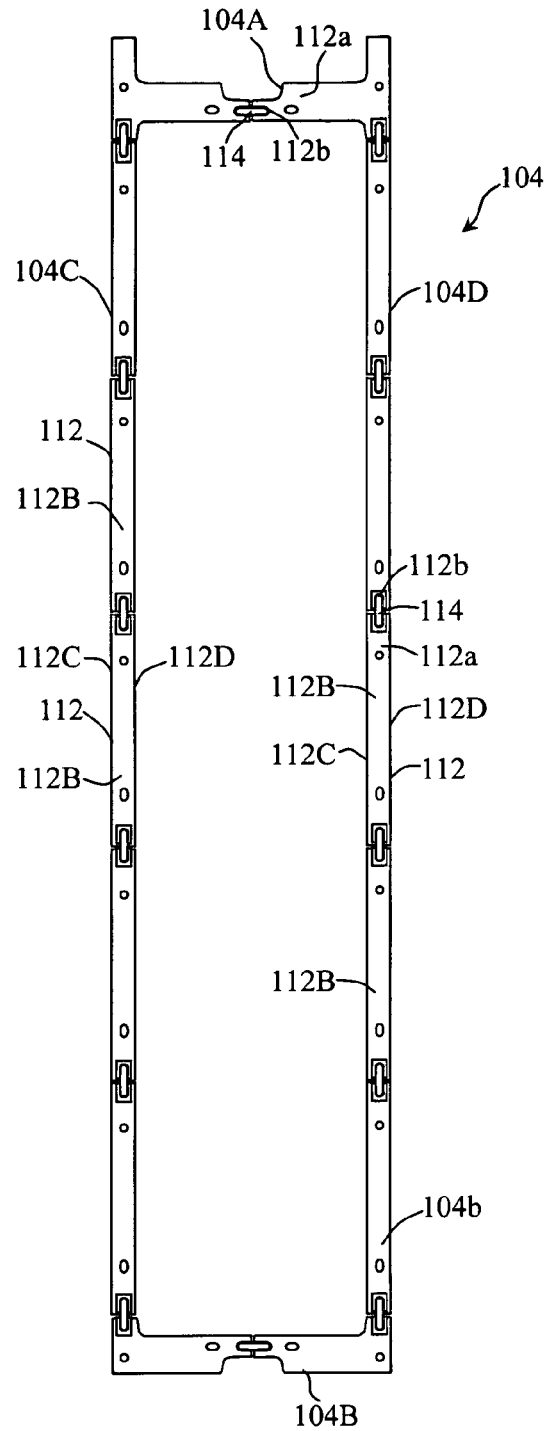
FIG. 2A  FIG. 2B

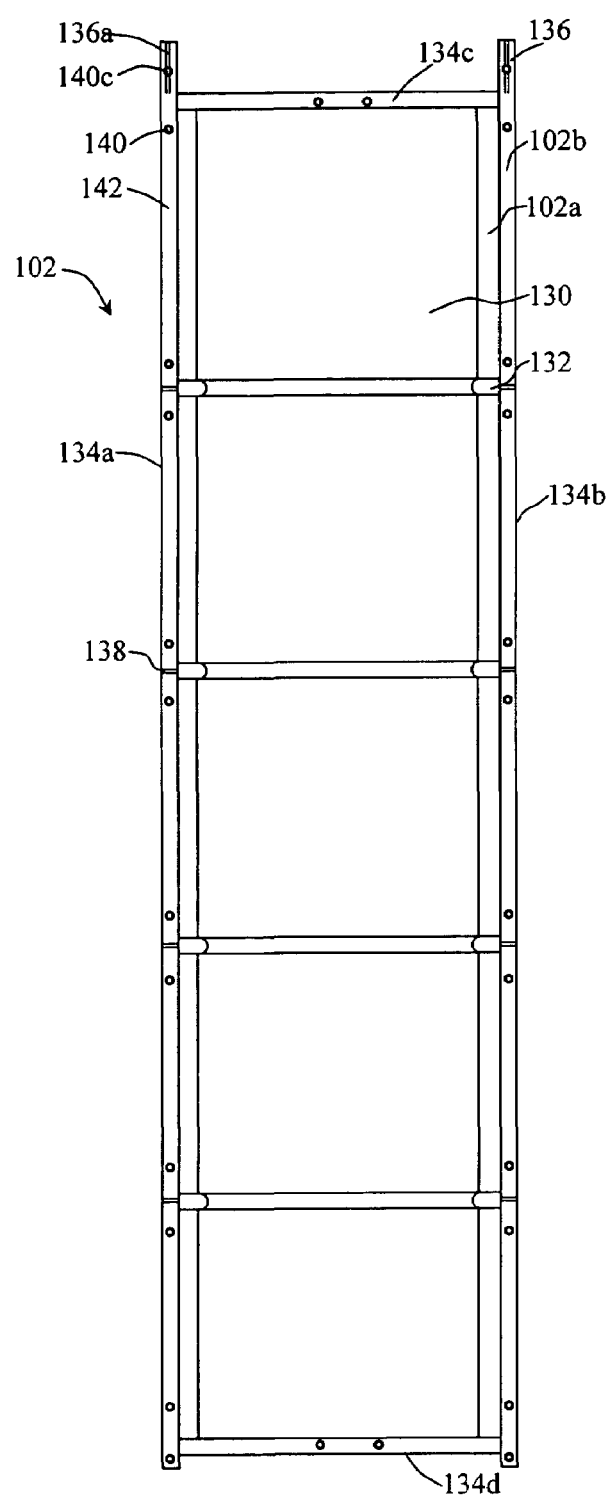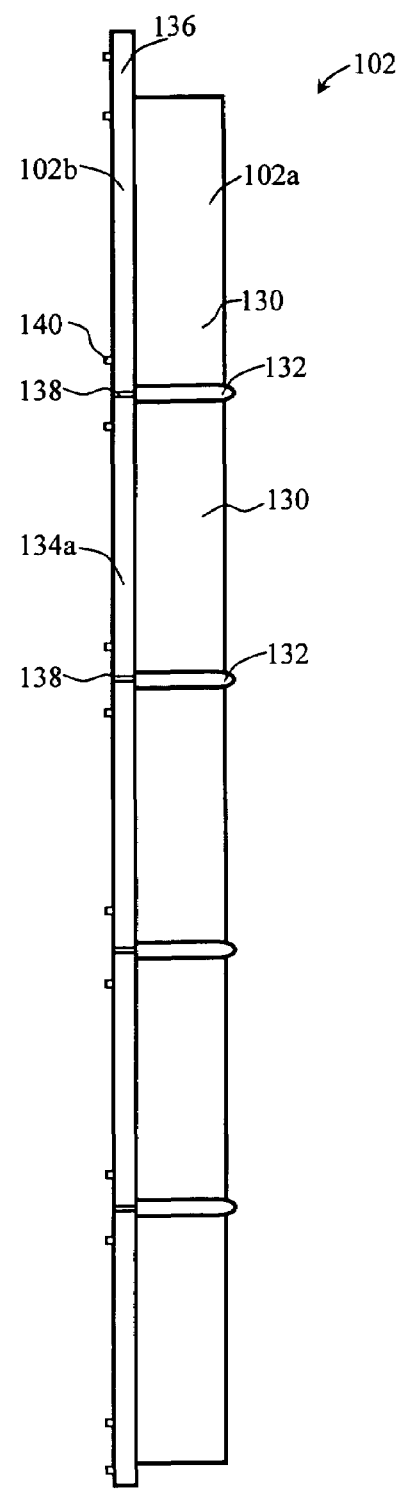
FIG. 4A　　　　FIG. 4B

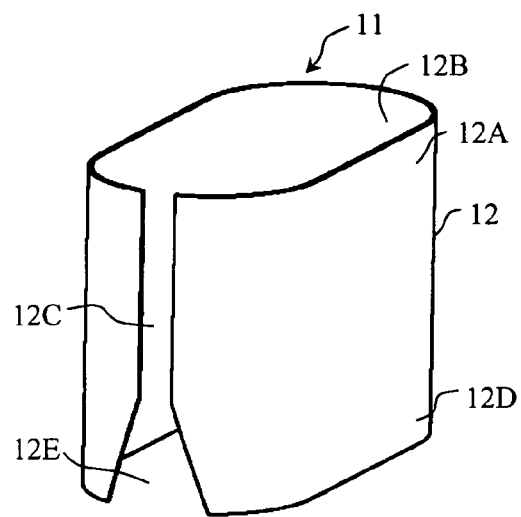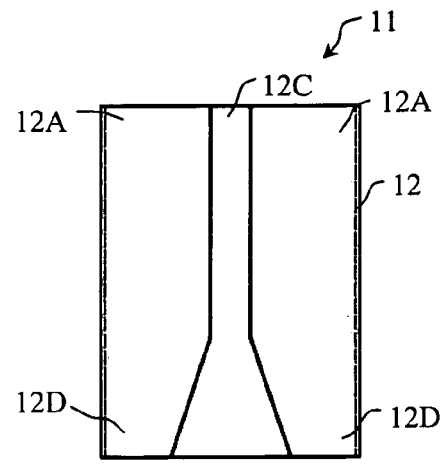
FIG. 9A     FIG. 9B
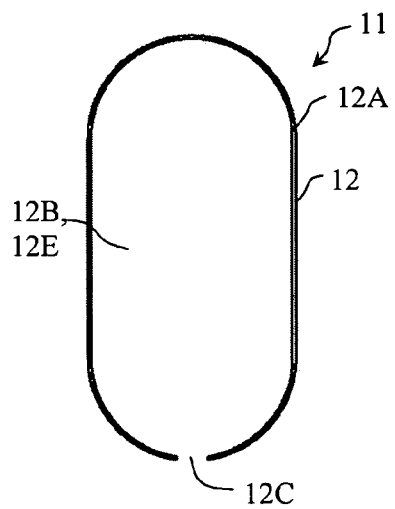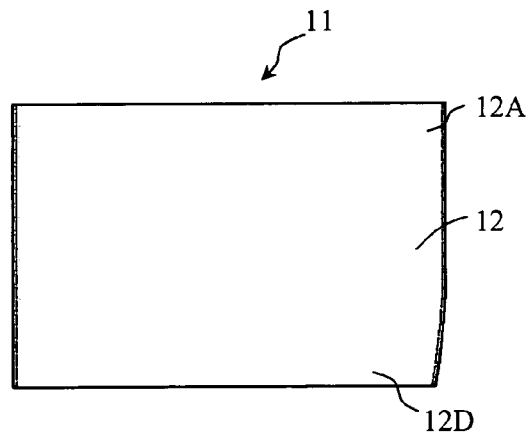
FIG. 9C     FIG. 9D

DIELECTRIC FRAME ASSEMBLY AND FUEL CELL MANIFOLD

BACKGROUND OF THE INVENTION

This invention relates to fuel cells and, in particular, to frame assemblies and manifolds for use in fuel cell stacks.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series to form a fuel cell stack.

A fuel cell stack may be an internally manifolded stack or an externally manifolded stack. An internally manifolded stack typically includes gas passages for delivery of fuel and oxidant built into the fuel cell plates. In an externally manifolded stack, fuel cell plates are left open on their ends and gas is delivered to the cells by way of manifolds sealed to the respective faces of the fuel cell stack. The manifolds in each type of fuel cell stack provide sealed passages for delivery of fuel and oxidant gases to the fuel cells and prevent those gases from leaking to the environment and to the other manifolds. These functions of the manifolds must be performed under the operating conditions of the fuel cell stack and for the duration of the stack life.

A gas seal established between the manifold edge and the fuel cell stack face is an important aspect of manifold performance. The manifolds, which are made from metallic materials, must be electrically isolated from the fuel cell stack which is typically electrically conductive and has an electrical potential gradient along its length and from its edge to the manifold. Dielectric insulators have been used between the metallic manifold and the fuel cell stack to produce electrical isolation between the manifold and the stack and to prevent the manifold from shorting out the stack, and to control electromotively driven electrolyte migration from the stack to the manifold. Dielectric insulators are typically made from brittle ceramic or mica materials which may be damaged as a result of thermal and mechanical stresses or chemical reaction on the manifold system during fuel cell operation. Moreover, a fuel cell stack will usually shrink over its life because the cell components creep and densify at high temperature and pressure. Such shrinkage and changes in fuel cell stack dimensions create additional stresses on the manifold system during stack operation. Accordingly, there is a need for a manifold system capable of absorbing at least partially the thermal and mechanical stresses so as to prevent damage to the manifold sealing system dielectric insulators and to effectively maintain electrical isolation and electrolyte migration inhibition between the manifold and the stack.

Modifications to manifold system components have been developed to improve the flexibility of the components and to better accommodate thermal expansion and contraction of the stack and the mechanical stresses on the dielectric insulator resulting therefrom. Conventional dielectric insulators currently used in the manifold system typically comprise a number of interlocking segments which allow the insulator to expand and contract with the stack. An example of such a dielectric insulator arrangement is disclosed in U.S. Pat. No. 4,414,294. In particular, the '294 patent discloses a rectangular insulator having a plurality of segments interconnected by slidable spline joints. Each of these spline joints includes a spline key fitted into keyways formed by adjacent end portions of the insulator segments. As shown and described in the '294 patent, the keys fitted into the keyways conform to the shape of the keyways and extend across the thickness of the keyways to provide sufficient gas sealing.

In addition, flexible manifolds have also been developed to improve their gas sealing capabilities and to reduce dielectric insulator damage. U.S. application Ser. No. 10/264,866 assigned to the same assignee herein discloses an example of such a flexible manifold system. Particularly, the '866 application discloses a manifold system having a manifold body which includes a number of pan sections connected by compound folds and a rail assembly including a number of rail members with a plurality of kerfs cut through a portion of their thickness at positions corresponding to the compound folds of the manifold body. The folds and the kerfs of the manifold system of the '866 application lend flexibility to the manifold assembly and improve the gas seal established between the manifold edge and the stack face. The manifold body and the rail assembly in the '866 application are electrically isolated from the stack by dielectric insulators which are secured to the rail assembly using round or cylindrical stainless steel pins protruding from the rail members.

One of the common problems associated with the above arrangements is the fracturing or breaking of the ceramic electrolyte migration inhibitor and electric insulator in joint areas of the dielectric insulator, i.e. the areas around the keyways and the pinning holes. These fractures and breaks result from the keys and pins reacting on the dielectric insulator to the resultant mechanical stresses and applied forces during the expansion and contraction of the stack.

Another common problem is the tearing and erosion of gaskets abutting the dielectric insulator caused by the sharp edges of the insulator keyway areas and of the keys. Such fractures, breaks and erosion may result in breaking of the gas seal and a breach of electrical isolation between the manifold system and the stack. Accordingly, means of minimizing stress on the dielectric insulator in the joint areas, and particularly in the keyway areas and in the areas around the pins, are needed to reduce dielectric failure and to redirect the mechanical forces away from the insulator during stack operation.

It is therefore an object of the present invention to provide a dielectric frame member having interlocking segments designed to overcome the above disadvantages.

It is also an object of the present invention to provide a dielectric frame member which is adapted to prevent tearing and erosion of the abutting gaskets.

It is a further object of the present invention to provide a fuel cell stack manifold having an improved pin design which reduces the mechanical stresses on the dielectric frame member.

SUMMARY OF THE INVENTION

In accordance with the principles of the present invention, the above and other objectives are realized in assembly having a dielectric frame which utilizes a plurality of segments, each segment having opposing first and second surfaces and first and second end portions. Each of the first and second end portions has an end surface and a cutout extending from the end surface of the end portion along the length of the segment and from the first surface to the second surface. The segments of the frame are arranged in abutting relationship with the first surfaces of the segments aligned and the second surfaces of said segments aligned and with the end surface of a first end portion of a segment abutting the end surface of the second end portion of the adjacent segment. In this way, the cutouts of the first and second end portions of abutting segments form a keyway and a key is situated in the keyway so as to hold the abutting segments together, and provide a gas seal.

In accordance with the invention, certain of the segments are provided with recesses in the first surfaces of the segments adjacent the cutouts. Preferably, the recesses are formed as slanting or inclined surfaces which slant or incline into the thickness of the segment and are adjacent to and end at the far end of the slot, i.e., the end of the slot farthest along length of the segment. The segments are arranged so that each end of a segment having a recess abuts an end of a segment also having a recess so that the resultant keyway has recesses at its opposing ends. Also, in accord with the invention, each key disposed in such a keyway has inclined end parts which incline into the thickness of the key and abut the recesses at the opposing ends of the keyway. Additionally, each segment having a recess has a slant or incline into the thickness of the segment at the end of its first surface adjacent the end surface whose end portion has a cutout abutted by the recess. Also, the segments with recesses are further beveled at the edges of the first surface and the edges of the end surfaces of the end sections.

With this configuration, the frame is better able to handle forces when used to insulate a fuel cell stack from its manifold. The frame also is able to preserve the integrity of the gaskets situated between the frame and fuel cell stack.

In the embodiment of the invention to be disclosed hereinafter, the vertical segments of the frame are all provided with recesses in their first surfaces adjacent the far ends of the cutouts in their respective first and second end portions, while the horizontal segments are provided with recesses in their first surfaces only in their second end portions which abut the first end portions of the vertical segments. In this embodiment also, the second end sections of the horizontal members are either T-shaped or elbow shaped. Additionally, in the disclosed embodiment, the second surfaces of certain of the segments are also provided with recesses adjacent the cutouts These recesses extend into the thickness of the segment and are formed by inclined surfaces which extend about the entire edge of the respective cutout. Finally, in this embodiment, the cutouts are half oblong in shape so that the keyways and keys are oblong in shape.

In accord with a further aspect of the invention, the above and other objectives are realized in a manifold assembly having a plurality of pins distributed about its periphery and adapted to better engage a dielectric frame. In particular, each of the pins to be received in an aperture in the frame has an end portion with opposing outer surfaces that incline inwardly into the thickness of the body of the pin and then proceed in line with the axis of the pin to a terminal end of the end portion. In the preferred form of the invention, the pin has a cylindrical body formed to have the described end portion.

In still a further aspect of the invention, inserts having dielectric bodies for insertion into the pin receiving holes of the dielectric frame member are provided.

BRIEF DESCRIPTION OF THE DRAWINGS

The above and other features and aspects of the present invention will become more apparent upon reading the following detailed description in conjunction with the accompanying drawings, in which:

FIGS. 2A and 2B show the dielectric frame member of the assembly of FIG. 1 from the stack side and manifold side, respectively;

FIG. 4A shows a top plan view of a manifold body and rail assembly in accordance with the present invention;

FIG. 4B shows a side view of the manifold body and rail assembly of FIG. 4A;

FIGS. 7A-7D, 8A-8D, 9A-9D and 10A-10D show various views of forms of an insert to be used as an insert in the holes of the dielectric frame member of the assembly of FIG. 1.

DETAILED DESCRIPTION

Figure 1:
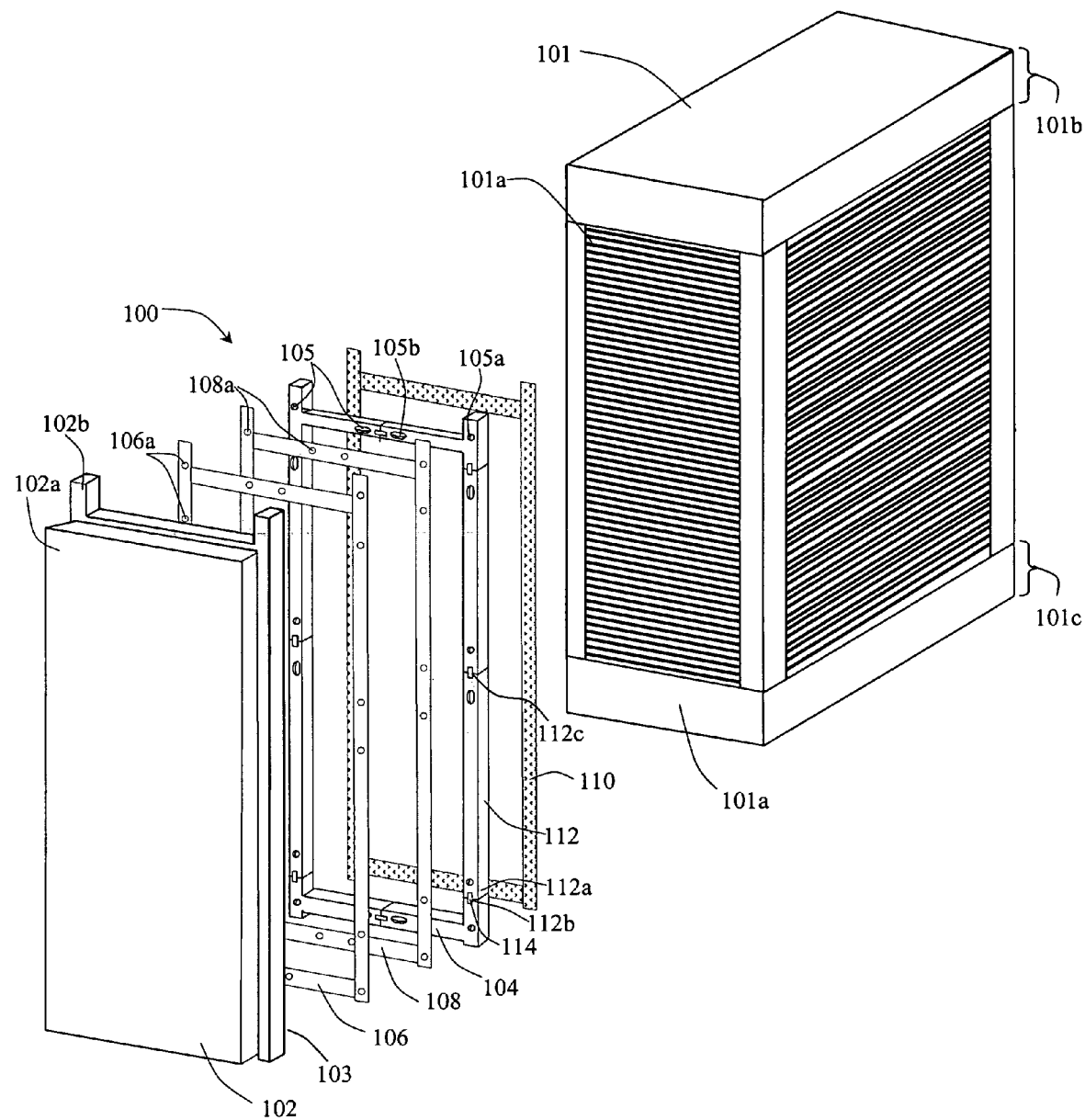
FIG. 1 is a perspective view of an externally manifolded fuel cell stack with a manifold and a dielectric frame assembly in accordance with the principles of the present invention.

FIG. 1 shows a manifold 102 and a dielectric frame assembly 100 in accordance with the principles of the present invention for use with an externally manifolded fuel cell stack 101. As shown, the manifold 102 is electrically isolated from the endplate 101b by the dielectric frame assembly 100. The dielectric frame assembly 100 in this case includes a dielectric member 104 and a plurality of isolating gaskets 106, 108, 110. The manifold 102 has a manifold body 102a and a manifold rail assembly 102b which is coupled to the manifold body 102a. The manifold body 102a preferably has a flexible construction as described in the '866 application, which is incorporated by reference herein. As shown and as described in more detail in the '866 application, the manifold body 102a rests within the rail assembly 102b so that the rail assembly 102b frames the manifold body 102a. The manifold 102 is made from metal and is disposed adjacent to the dielectric frame assembly 100, which electrically isolates the manifold from the fuel cell stack 101. As shown, the shape and dimensions along the stack-side plane of the dielectric frame member 104 and the isolating gaskets 106, 108, 110 substantially correspond to the shape and dimensions of the manifold rail assembly 102b.

The isolating gaskets include a first manifold-side gasket 106, a second manifold-side gasket 108 and a compressible stack-side gasket 110. The first 106 can be formed from mica or other suitable electrically insulating material. The second gasket 108, in turn, can be formed from zirconia felt or any other suitable material possessing similar temperature, dielectric, and gas flow impedance properties. The first manifold-side gasket 106 is disposed in an abutting relationship between the manifold rail assembly 102b and the second manifold-side gasket 108, which in turn abuts the dielectric member 104. The first and second manifold-side gaskets 106, 108 provide a seal between the dielectric member 104 and the manifold 102 by conforming to the dielectric and manifold surfaces, and in particular to the dielectric joints and irregularities on the surface of the manifold.

The compressible stack-side gasket 110, like the gasket 108, can be formed from zirconia felt or any other suitable material possessing similar temperature, dielectric, and gas flow impedance properties. The compressible stack-side gasket 110 is disposed between the stack-side surface of the dielectric member 104 and a fuel cell stack face 101a in an abutting relationship.

As described in more detail herein below, the rail assembly 102b of the manifold 102 is adapted to engage and hold the dielectric frame assembly 100. In particular, the rail assembly 102b includes a plurality of pins (not shown in FIG. 1) distributed about its periphery which are received in and engage a plurality of through openings 106a, 108a situated about the peripheries of the first and second gaskets 106, 108, respectively and a plurality of openings 105 distributed about the periphery of the dielectric frame member. The positions of these openings 106a, 108a, 105 are aligned with the pins formed on the rail assembly.

As shown in FIG. 1, the openings 105 in the dielectric frame member 104 extend partially through the thickness of the frame member 104 and may include openings having a round shape 105a and an oval shape 105b. In an assembled state, the pins engage with the openings 106a, 108a, 105 in the first and second gaskets 106, 108 and the dielectric frame member 104. The engagement of the pins and the openings causes the gaskets 106, 108 and the dielectric frame member 104 to move together with the manifold as the fuel cell stack expands and contracts and prevents lateral movement by the gaskets and the member with respect to the manifold 102.

As shown schematically in FIG. 1, and as described in more detail herein below, the dielectric frame member 104 is formed from a plurality of segments 112 joined together at their ends. In particular, end portions 112a of the segments 112 are configured so that abutting end portions together define a keyway 112b into which a key 114 is fitted. In this way, the segments 112 are held together so that the dielectric frame member 104 can expand and contract with the fuel cell stack 101 and the manifold components. In accord with the invention, and as described in more detail herein below, the keys 114 and the keyways 112b are configured to promote slippage of the gaskets abutting the segments 112 and to prevent tearing and erosion of the abutting gaskets.

A more detailed view of the dielectric frame member 104 is shown in FIGS. 2A and 2B. FIG. 2A shows a first surface 104A of the dielectric frame member 104 formed by aligned first surfaces 112A of the segments 112. The surface 104A abuts the stack-side gasket 110. FIG. 2B, in turn, shows the opposing surface 104B of the frame member 104 which is formed by aligned second surfaces 112B of the segments 112. Surface 104b abuts the second manifold-side gasket 108. Each segment 112 also includes third and fourth opposing surfaces 112C and 112D which connect to opposite opposing ends of the ends of the surfaces 112A and 112B. Each frame segment 112 can be formed from a ceramic material or other suitable dielectric material.

As shown, the segments 112 have a number of configurations. These configurations include vertical segments whose end sections are "rod-shaped", upper horizontal segments each having a reduced thickness "rod-shaped" end section and a "T-shaped" end section and lower horizontal segments each having a reduced thickness "rod-shaped" end section and an end section which is "elbow-shaped". In the case shown, the two upper horizontal segments form the top 104A of the frame, the two lower horizontal segments form the bottom 104B of the frame, a first set of vertical segments form one side 104C of the frame and a second set of vertically disposed segments form the opposing side 104D of the frame 104. These segments are connected by the respective keys 114 and keyways 112b at the abutting end portions or sections 112a of the segments 112. As shown, the keyways are formed at the "rod-shaped" end sections of the vertical segments, the "rod-shaped" and "elbow-shaped" end sections of the lower horizontal segments and the "rod-shaped" and lower short leg of the "T-shaped" end sections of the upper horizontal segments. As a result of abutting the segments together, the frame member 104 takes on a rectangular shape.

As can be appreciated, the segments 112 of the invention can take on other configurations than those illustrated depending on the desired shape of the frame member 104 dictated by the shape of the assembly with which the frame member is to be used. Thus, the segments might, for example, be all rod-shaped segments in which case the end sections 112a would have to be appropriately configured to abut so that the abutting segments form the desired keyways.

In accordance with the principles of the present invention, the end sections 112a of the segments 112 are configured so that the resultant keyways 112b promote slippage of the adjoining gaskets and reduce degradation of the gaskets as by tearing, etc. Additionally, the keys 114 are also configured to aid in slippage and reduce such degradation.

Figure 2C:
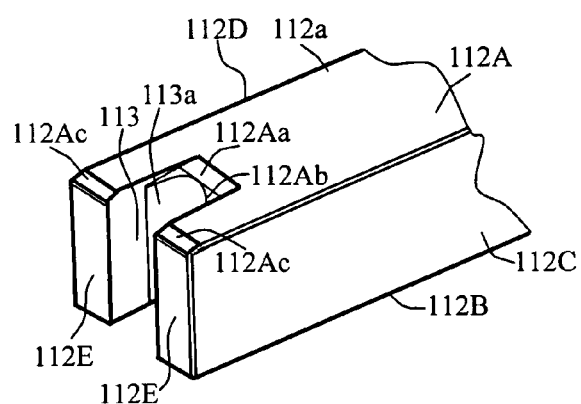
FIGS. 2C and 2D show perspective views from opposite surfaces of an end portion of a segment of the dielectric frame member of FIGS. 2A and 2B.
Figure 2D:
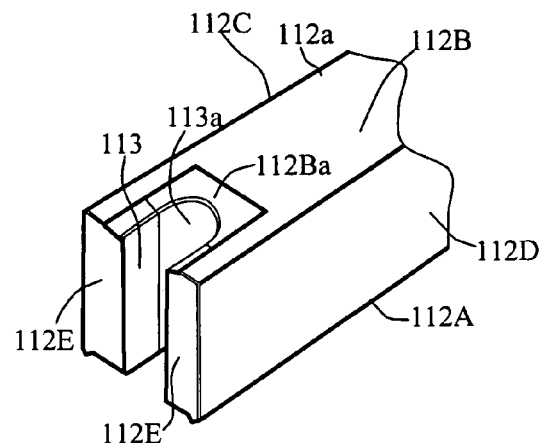

FIGS. 2C and 2D show one of the end sections 112a of a vertical segment viewed from the opposite surfaces 112A and 112B, respectively. In the case illustrated, the other end section of the segment is of like configuration, as are all the end sections of the other vertical segments. Moreover, in the case shown, the "elbow-shaped" end sections of the lower horizontal members and the lower part of the "T-shaped" end sections of the upper horizontal members are also of the same configuration.

As can be seen in FIGS. 2C and 2D, the end section 112a includes a cutout 113 extending from the end surface 112E of the end section into and along the length of the body. The cutout 113 extends between the surfaces 112A and 112B of the segment and is spaced from the surfaces 112C and 112D of the segment. As shown, the cutout is half oblong in shape with the far end 113a of the cutout being rounded. In accord with the invention, at the far end 113a of the cutout 113, i.e., the end farthest along the length of the segment, the first surface 112A is provided with a recess 112Aa. As shown, the recess is formed as a slanted or inclined surface into the thickness of the body of the segment 112 and terminating at the edge of the far end 113a of the cutout 113. A further level part 12Ab of the surface 112A extends from end of the recess and ends at the edges of the cutout adjacent where the recess 113 abuts the cutout. As also can be seen, the surface 112A includes a further inclined slanted portion 112Ac adjacent the end surface 112E.

As can be appreciated, therefore, when the end sections as shown in FIGS. 2C and 2D of two adjoining segments 112 are placed in abutting relationship, the resultant keyway has an oblong shape. Also, the keyway is bordered by slanting recess surfaces (formed by the slanting recesses 112Aa) at both ends of the keyway defined by the far ends 113a of the cutouts 113 of the segments. The keyway has additional slanting surfaces (formed by the surfaces 112Ac) at the sides of the keyway formed by the abutting end surfaces 112E of the segments. These slanting surfaces provide less abrupt surface contact and thus facilitate sliding contact between the frame segments and the members adjoining the segments and, as a result, reduce interaction and tearing of such members. This is especially so for gaskets placed adjacent the frame segments.

Figure 3A:
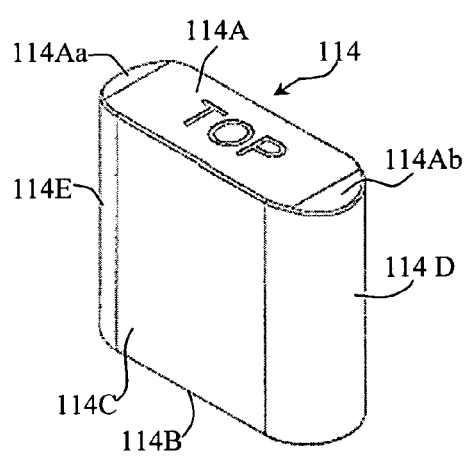
FIG. 3A shows a perspective view of a key used in the dielectric frame member of FIGS. 2A-2B.
Figure 3B:
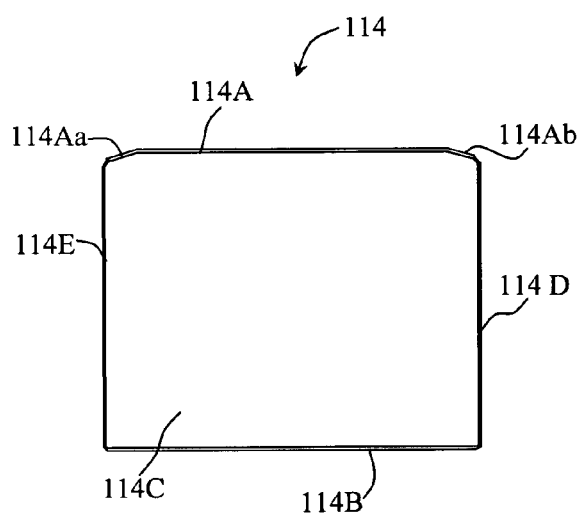
FIG. 3B shows a side view of the key shown in FIG. 3A.

In order to further facilitate this sliding action and less abrupt contact, each of the keys 114 used with the aforesaid keyways is configured to have inclined surfaces situated to abut the inclined recesses at the opposing ends of the corresponding keyway. FIGS. 3A and 3B show a key 114 adapted in this manner. The key 114 is formed from the same or similar dielectric material as the frame segments 112.

As shown, the key 114 has a substantially oblong cylindrical shape including upper and lower surfaces 114A and 114B, a central portion 114C and two rounded end portions 114D, 114E which are adjacent to the opposing sides of the central portion 114C. This general oblong shape fits the oblong shape of the keyway 113.

The key 114 also has opposing ends 114Aa and 114Ab of its upper surface 114A inclined into the thickness of the key. As above-mentioned, when the key 114 is situated in a keyway 112b, the inclined ends 114Aa and 114Ab meet the recesses 112Aa bordering adjacent ends of the keyway. The inclined ends of the key 114 thus provide less abrupt slanting surfaces for interaction with members placed adjacent the frame segments. This promotes slipping and reduces damage as by tearing or breaking of such adjacent member.

To further prevent damage to the frame 104, edges between selective surfaces of the frame segments 112 and selective surfaces of the keys 112 can be beveled. Thus, as shown, in FIG. 2C, the edges between the first surface 112A and the end surfaces 112E and the first surface 112A and the side surfaces 112C and 112D are beveled. Likewise, the edges between the side surfaces 112C, 112D and the end surfaces 112E are also beveled. Finally, the edges between the upper surface 114a of the key 114 and the central and end portions 114C-114E are similarly beveled.

In an illustrative form of the invention, the incline of the recesses 112Aa, the incline of the surfaces 112Ac, and the incline of the key ends 114Aa and 114Ab is made equal. An incline in the range of 10-30 degrees is usable. Also, a usable incline for the beveled edges is 35-60 degrees.

In the disclosed embodiment and as shown in FIG. 2B, each segment 112 having a recess 112Aa is also provided with a recess 112Ba in the surface 112B. This recess surrounds the entire edge of the cutout 113 and is inclined or slanted to also soften the interaction between the segment and the adjoining member. A usable angle for this incline is 10-30 degrees.

It should be noted that while the cutouts 113 have been illustrated as half oblong in shape resulting in oblong shaped keyways, other shapes can be used. Thus, for example, part oval or part rectangular configurations can be used for the cutouts which result in oval and rectangular keyways. The shape of the keys 114 would, of course, be changed in these cases to accommodate the shape of the keyways.

As can also be seen in FIGS. 1A and 1B, in the illustrated form of the invention, the keyways of the adjoining "rod-shaped" end sections 112a of the upper and lower horizontal segments of the frame 104 are oblong in shape, but without adjoining recesses. Similarly, the oblong keys used in these keyways have flat upper surfaces without inclined ends. This is due to these sections of the segments of the frame 104 requiring less slippage enhancement in these areas than those of the vertical segments. If increased slippage is desired, however, recesses can be provided in the end sections and inclined ends of the keys as in the vertical segments.

In the illustrative arrangement of the frame member 104 shown in FIGS. 2A and 2B, the width of the horizontal and vertical segments has been selected to accommodate the width of the corresponding horizontal and vertical members of the rail assembly 102b. Additionally, the upper legs of the "T-shaped" end sections 112a of the upper horizontal segments 112 match the like upper legs of the horizontal members of the rail assembly 102b.

FIGS. 4A and 4B show plan and side views, respectively, of the manifold 102 of FIG. 1 in greater detail. As shown and described above, the manifold 102 comprises a manifold body 102a and a manifold rail assembly 102b. The manifold body 102a has a flexible construction, as described in detail in the '866 patent application, forming a plurality of pan sections 130 separated by compound folds 132. The compound folds 132 allow the manifold 102 to conform to the fuel cell stack's shape. The rail assembly 102b, which is formed from a plurality of rail members 134a-d, frames the manifold body 102a.

Vertical rail members 134a, 134b extend along the length of the manifold body 102a and form side rails of the rail assembly 102b, while horizontal rail members 134c and 134d frame the top and bottom portions of the manifold body 102a and form the top and bottom rails, respectively, of the assembly 102b. As shown in FIG. 4A, the side rails 134a, 134b of the rail assembly 102b extend beyond the top rail member 134c of the assembly 102b, and form extensions 136. Extensions 136 lend the manifold 102 room for expansion during fuel cell stack operation and align with the corresponding portions of the dielectric member 104 and isolating gaskets 106, 108, 110, as shown in FIG. 1.

As described in more detail in the '866 patent application and as shown in FIG. 4B, the horizontal rail members 134a, 134b of the assembly 102b include a plurality of cutouts or kerfs 138 extending through a portion of their thickness. The positions of the kerfs 138 align with the compound folds 132 of the manifold body 102a. As can be appreciated, the compound folds 132 in the manifold body 102a and the kerfs 138 in the rail members 134a, 134b lend flexibility to the manifold 102.

As mentioned with respect to FIG. 1 and as shown in FIGS. 4A and 4B, the manifold 102 includes a plurality of pins 140 distributed about the periphery of the stack side surface. The pins 140 extend from the rail assembly 102b and are adapted to engage with the slots or openings formed in the dielectric assembly 100 shown in FIG. 1. In particular, the pins 140 constrain and position the individual segments 112 of the dielectric frame member 104 to the manifold rail assembly 102b within the planes defined by the stack face 101a and the manifold face. Specifically, the pins 140 constrain in-plane translation of the dielectric frame member 104 and the isolating gaskets 106, 108 as well as rotation of the member 104 and the gaskets 106, 108 about the pins 140. The pins 140 can be formed from metallic materials which are the same or similar to the materials forming the rail assembly 102b.

A shown in FIGS. 4A and 4B, each of the vertical rails 134a, 134b includes at least one pin 140 formed on each side of the kerfs 138 and also includes a pin 140 near the end of the rail. The latter pin is formed in the extension member 136 of the respective rail and is slidably mounted in a notch 136a in the extension so as to better maintain the isolating gaskets in place during stack movement. Each vertical rail 134c, 134d includes two pins 140 near the center of the rail.

As described above with respect to FIG. 1, the pins 140 are adapted fit into the through openings 106a, 108a in the manifold-side gaskets 106, 108 and into the openings 105 in the dielectric member 104. This holds the manifold 102 and the dielectric frame assembly 100 together and minimizes lateral movement of the dielectric frame assembly components relative to the manifold and the stack.

Figure 5A:
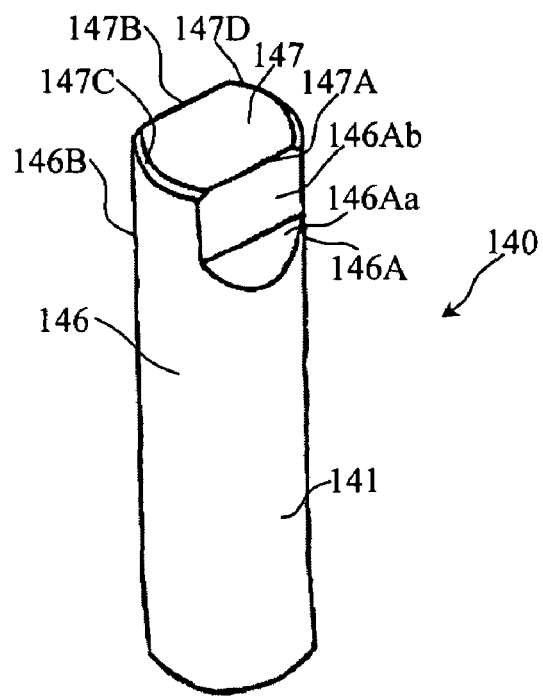
FIG. 5A shows a perspective view of a pin configuration of the manifold and rail assembly of FIGS. 4A and 4B.
Figure 5B:
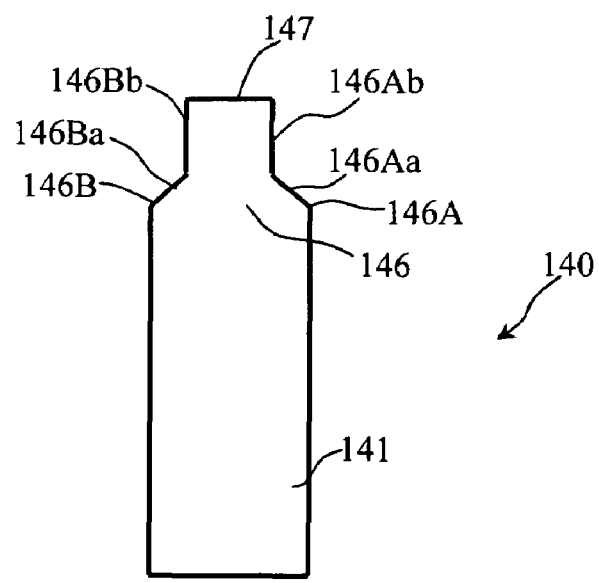
FIG. 5B shows a side view of the pin of FIG. 5A.

FIGS. 5A and 5B are perspective and side views showing in more detail the configuration of each of the pins 140 in accord with the present invention. With this configuration for the pins, the stresses placed on the dielectric member 104 by the manifold, particularly in the areas of and around the openings 105, are reduced. This configuration also allows pivoting of the manifold in relationship to the dielectric frame assembly when the pins 140 are engaged with the slots in the assembly.

As shown in FIG. 5A, each pin 140 has a substantially circular cylindrical body 141 which includes a tapered upper end 146. More particularly, the upper end 146 of the pin 140 at its opposing sides 146A and 146B is tapered or inclined into the thickness of the pin so as to form slanting segments 146Aa and 146Ba. These segments are followed by segments 146Ab and 146Bb which extend upright or parallel to the axis of the body 141. This results in an oblong shape for the pin end surface 147 with opposing straight edges 147A and 147B formed at the edges of the segments 146Ab, 146Bb and opposing round edges 147C and 147D formed at the cylindrical body of the pin. The rounded edges 147C and 147D are beveled to eliminate sharp edges that may cause damage to the dielectric frame member 104.

A usable angle for the incline of the segments 146Aa and 146Ba can be from 10-60 degrees, depending on the requirements of the manifold and dielectric frame assembly.

Figure 6A:
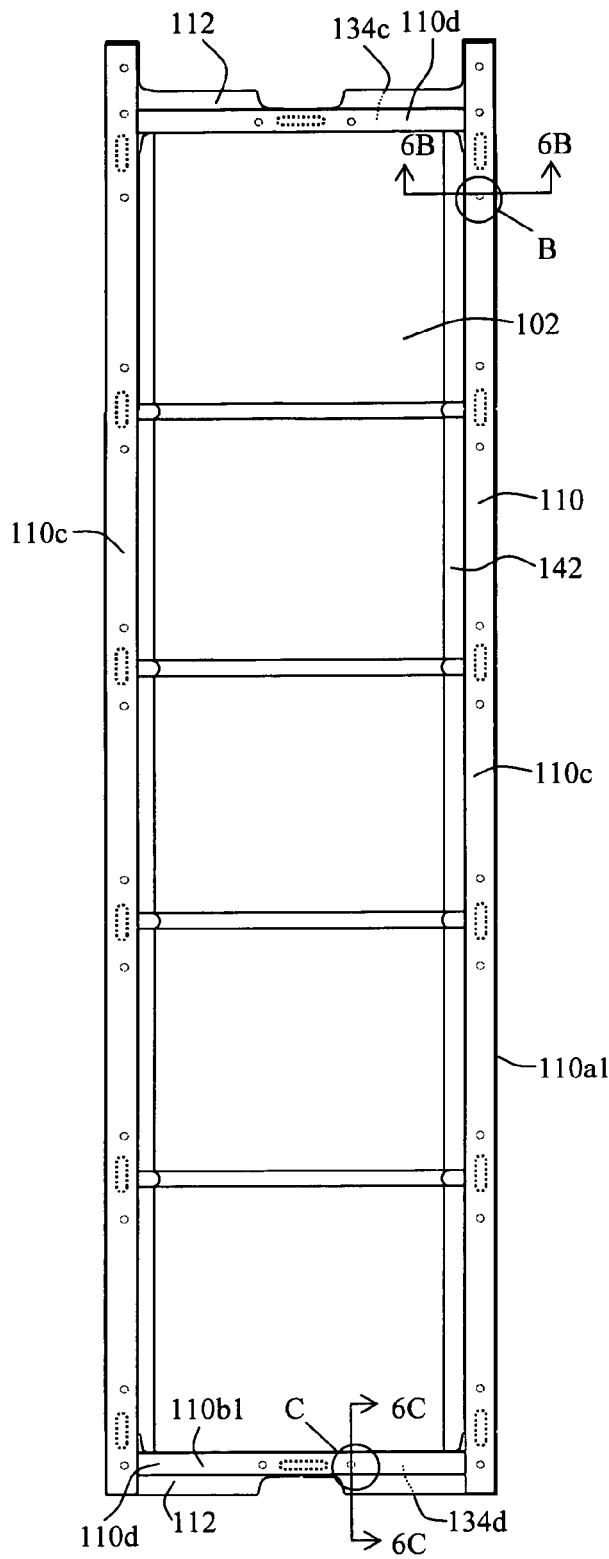
FIG. 6A shows a top plan view of the manifold and dielectric frame assembly of FIG. 1 attached to a dielectric frame.

FIG. 6A shows a view from the stack-side surface 142 of the manifold 102 engaged with the dielectric frame assembly 100. As can be seen, a portion of the width of the horizontal segments 112 of the dielectric member 104 is greater than the width of the horizontal rails 134c-d of the manifold rail assembly 102b. This provides additional gas sealing and electric isolation between the stack (not shown) and the manifold 102.

Figure 6B:
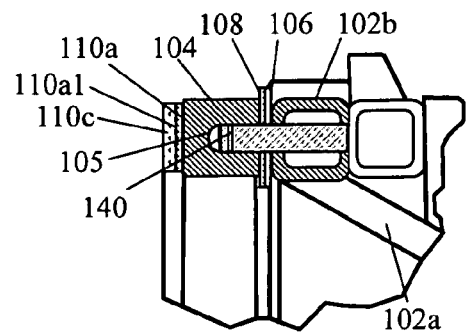
FIG. 6B shows a detailed cross-sectional view of the assembly of FIG. 6A encircled as "B" in FIG. 6A and taken along line 6B-6B.
Figure 6C:
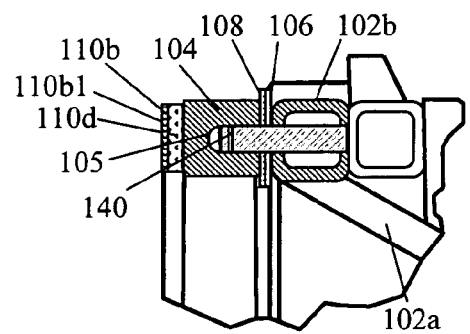
FIG. 6C shows a detailed cross-sectional view of the assembly of FIG. 6A encircled as "C" in FIG. 6A and taken along line 6C-6C.
Figure 7A:
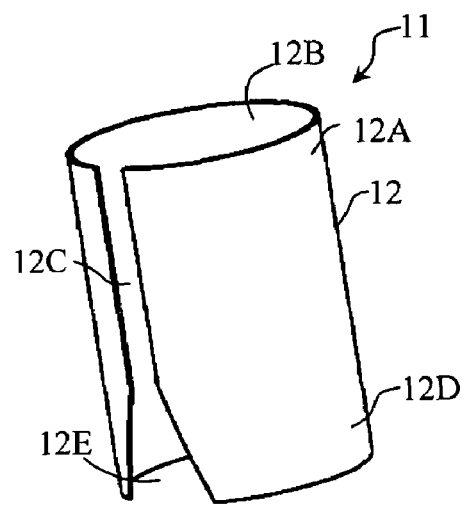
Figure 7B:
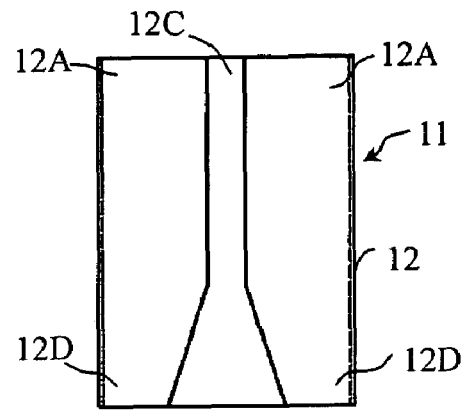
Figure 7C:
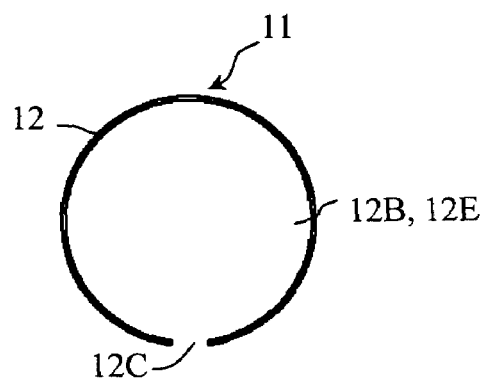
Figure 7D:
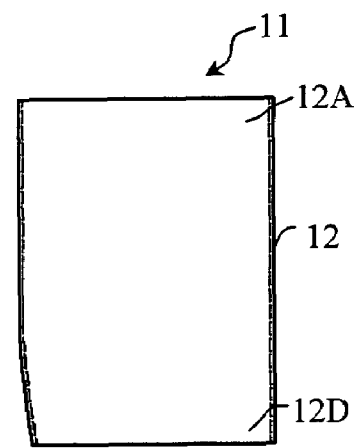
Figure 8A:
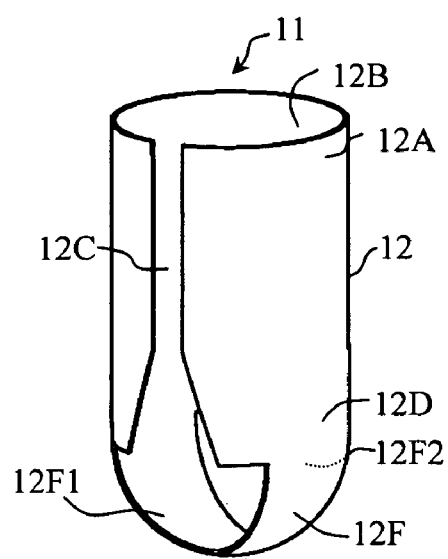
Figure 8B:
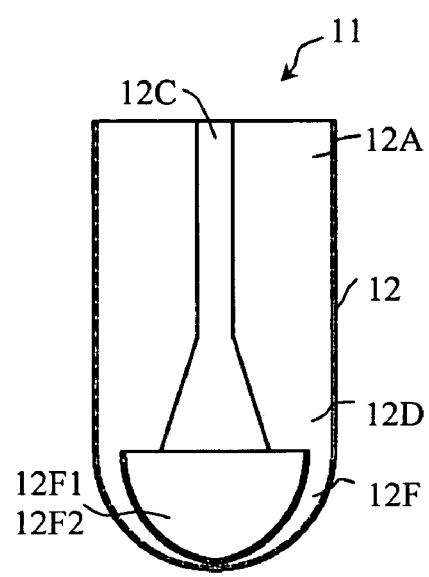
Figure 8C:
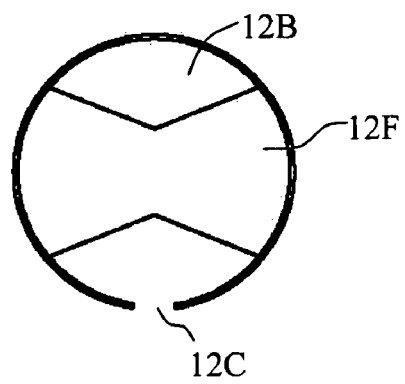
Figure 8D:
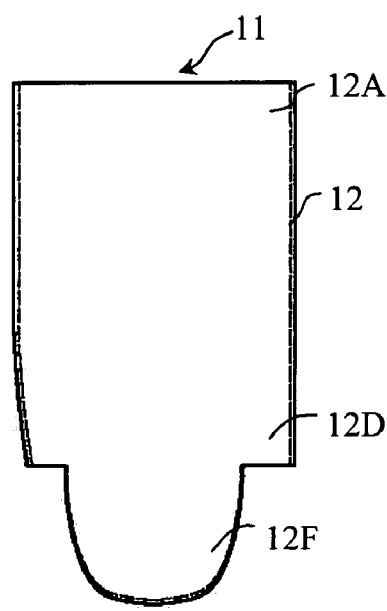
Figure 10A:
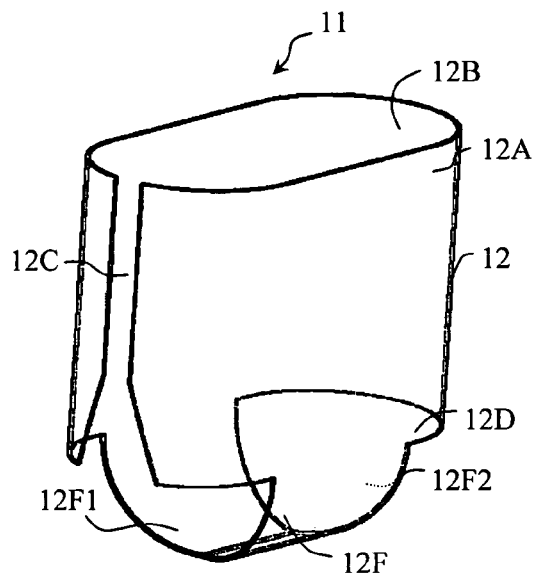
Figure 10B:
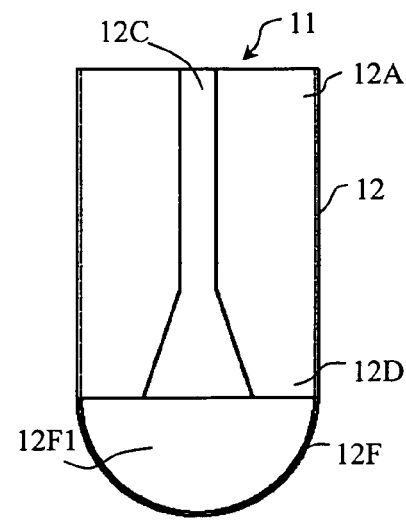
Figure 10C:
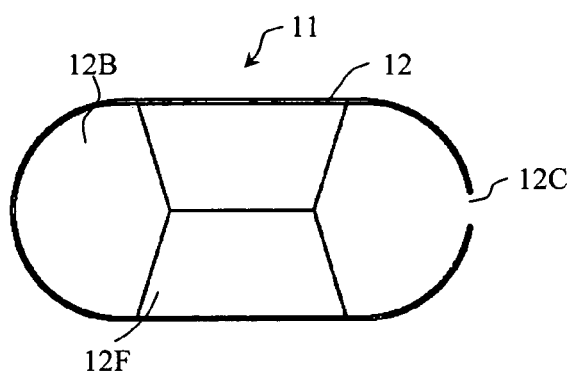
Figure 10D:
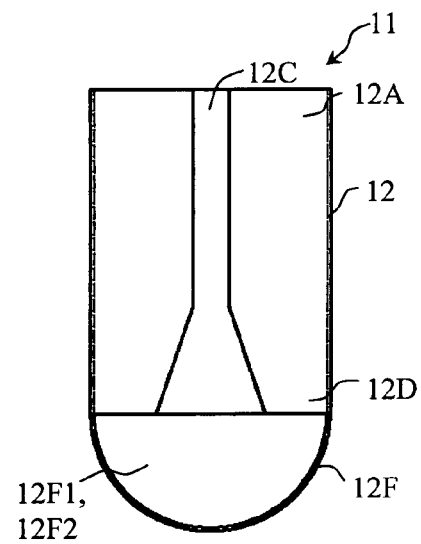

Referring to FIGS. 6A-6C, the compressible stack-side gasket 110 is provided with a slip-plane 110a at pre-selected areas on the manifold-side surface 110a1 of the gasket and a slip-plane 110b at pre-selected areas on the stack-side surface 110b1 of the gasket 110. The details of the slip plane design are described in copending application Ser. No. 11/022,977, assigned to the same assignee hereof. In particular, the slip-plane 110a on the manifold-side surface 110a1 is formed on the vertical rails 110c of the gasket, while the slip-plane 110b on the stack-side surface 110b1 is formed along the horizontal rails 110d of the gasket 110. The manifold-side slip-plane 110a facilitates relative motion between the stack face 101a and the manifold dielectric frame member 104, while the stack-side slip-plane 110b facilitates relative motion between the stack endplates 101b, 101c and the compressible gasket 110.

The engagement of the pins 140 with the dielectric frame assembly 100 and the formation of the slip-planes 110a, 110b are shown in detail in FIGS. 6B and 6C. These figures illustrate cross-sectional views of the manifold 102 and the dielectric frame assembly 100 of FIG. 6A taken in the encircled areas marked as "B" and "C" and along the lines 6B-6B and 6C-6C, respectively.

As shown in FIGS. 6B and 6C, the pin 140 formed on the rail member 134a of the rail assembly 102b is inserted into corresponding slots or openings 106a, 108a in the first manifold-side gasket 106 and the second manifold-side gasket 108, respectively, to engage these isolating gaskets with the manifold 102a and to prevent their lateral movement with respect to the manifold 102. The pin 140 is then inserted into the corresponding opening 105 in the dielectric member 104 to engage the member 104 with the manifold 102. As can be seen, the opening 105 extends through a portion of the thickness of the member and the depth of the opening may be greater than the length of the pin portion extending into the opening 105. The construction of the pin 140, as above-described, reduces the stress on the dielectric frame member 104 in and around the opening 105, particularly when the isolating gaskets 106, 108 between the dielectric frame member 104 and the manifold 102 are compressed and the pin 140 is pushed further into the opening. The pin configuration also reduces the stress on the dielectric frame member 104 caused by the pivoting of the manifold 102 in relation to the member 104.

Further, the manifold-side slip-plane 110a along the vertical rail members 110c of the compressible gasket 110 is shown in FIG. 6B, and the stack-side slip-plane 110b along the horizontal vertical rail members 110d is shown in FIG. 6C. As can be seen in FIG. 6B and as mentioned above, the slip-plane 110a is on the manifold-side surface 110a1 of the gasket rail members 110c so as to abut the dielectric member 104. In contrast, the slip-plane 110b is on the stack-side surface 110b1 of the rail members 110d and abuts the fuel cell stack endplates 101b, 101c. As also mentioned above, the details of each slip plane are described in the aforementioned copending application.

It should be noted that the pins 140 can include pins that have a shape other than circular cylindrical. In particular, oblong shaped pins can be used in certain positions on the rail members and would engage with corresponding oblong shaped holes 105 (see, FIG. 1) in the dielectric member 104. The oblong shaped pins can have fully cylindrical untapered bodies.

In a further aspect of the invention, the holes 105 in the dielectric frame member can be provided with inserts 11 which are inserted in the holes 105 and have dielectric bodies configured to receive and at least partially surround the body portions of the pins 140. These inserts provide additional electrical isolation of the dielectric frame 104 from the pins 140 and, as a result, from the rail assembly 102b and manifold 102. They also mitigate against Hertzian contact stresses caused by the pins on the surfaces of the frame holes.

FIGS. 7A-7D, 8A-8D, 9A-9D and 10A-10D show various forms of the inserts 11. Each insert 11 has a dielectric body formed as an elongated shell 12 having an opening 12B at an end 12A. The opening 12B faces out of the corresponding hole 105 when the insert 11 is seated in the hole to receive the corresponding pin. The shell 12 has an elongated slot 12C extending from the opening 12B toward the opposite end 12D. The slot 12C widens toward the end 12D. In the illustrative cases shown, the slot is of a constant width for a certain length of the shell and then widens in a funnel shape. The presence of the slot 12C prevents over-surrounding or over-wrapping of the corresponding pin body and allows for thermal pin growth.

The shells 12 of FIGS. 7A-7D and FIGS. 8A-8D are circular cylindrical in configuration and are for use with holes 105 and pins with like circular cylindrical configurations. The shells of FIGS. 9A-9D and FIGS. 10A-10D are oblong in configuration and are for use with holes 105 and pins 140 having like oblong configuration.

Moreover, the shells of FIGS. 7A-7D and FIGS. 9A-9D are for use with holes 105 having flat bottoms. Accordingly, these shells have openings 12E at the ends 12D. On the other hand the shells of FIGS. 8A-8D and 10A-10D are for holes 105 having closed and rounded bottoms so that the ends 12D of these shells have closed and rounded portions or crowns 12F. Additionally, opposite sides of the portions or crowns 12F have enlarged through openings 12F1 and 12F2, one of which 12F1 communicates with the slot 12C. The crowns 12F prevent the shell 12 from bunching up at the rounded bottom of the hole 105 when the insert is assembled into the hole.

The dielectric bodies 12 can be formed of a dielectric having a high dielectric resistivity such as, for example, mica. Also, shells having a thickness of about 0.006 inches are usable. Of course, shells of a greater or lesser thickness can also be used depending upon the application.

It should also be noted that the principles of the invention apply to dielectric frame assemblies including any number of isolating gaskets and dielectric frame members. Moreover, the dielectric frame assembly and manifold arrangement in accord with the invention may be used with fuel cell stacks having all or some of their respective stack faces externally manifolded and to stacks having any number of faces and manifolds.

In all cases it is understood that the above-described arrangements are merely illustrative of the many possible specific embodiments that represent applications of the present invention. Numerous varied other arrangements can be readily devised in accordance with the principles of the present invention without departing from the spirit and scope of the invention.

What is claimed is:

1. An assembly comprising:
   a dielectric frame including:
   a plurality of segments, each segment having opposing first and second surfaces and first and second ends portions, each of said first and second end portions having an end surface and a cutout extending from the end surface of the end portion along the length of the segment and from said first surface to said second surface;
   said segments being arranged in abutting relationship with the first surfaces of the segments aligned and the second surfaces of said segments aligned and with the end surface of a first end portion of a segment abutting the end surface of the second end portion of the adjacent segment, the cutouts of the first and second end portions of abutting segments forming a keyway;
   a plurality of keys, each key situated in a keyway so as to hold the abutting segments together; and
   wherein certain of said segments have a recess in the first surface of the segment in one or more of the first end portion and the second end portion of the segment adjacent the cutout, each said recess comprising a surface inclined into the thickness of the respective segment, each said recess being adjacent the far end of the respective cutout, said far end being farthest from the end surface of the end portion of the segment having the cutout, and each said recess being followed by a surface which is level and ends at the portions of the adjacent cutout; and
   wherein each said key has opposing first and second surfaces, said first surface of each key being aligned with the first surfaces of the abutting segments held together by that key, and each key in a keyway defined by cutouts having adjacent recesses has opposing ends of the first surface of the key inclined into the thickness of the key.

2. An assembly in accordance with claim 1, wherein each cutout is part oblong in shape with the curved part of the oblong shape being at the far end of the cutout.

3. An assembly in accordance with claim 1, wherein each end section of a segment whose cutout has an adjacent recess abuts an end section of a segment whose cutout also has an adjacent recess.

4. An assembly in accordance with claim 3, wherein the angle of incline of the recess of a segment is equal to the angle of incline of the first surface of the segment adjacent the end surface of the segment.

5. An assembly in accordance with claim 4, wherein said angle of incline of each recess is the same.

6. An assembly in accordance with claim 5, wherein said angle of incline of each recess is in a range from 10-30 degrees.

7. An assembly in accordance with claim 1, wherein the first surface of each segment having a recess is inclined into the thickness of the segment adjacent the end surface of the end section whose cutout is adjacent the recess.

8. An assembly in accordance with claim 7, wherein said second surface of each segment having a recess has a further recess around the periphery of the cutout adjacent said recess, said further recess comprising an inclined surface.

9. An assembly in accordance with claim 8, wherein the incline of the surface of each recess and each further recess is in a range from 10-30 degrees.

10. An assembly in accordance with claim 7, wherein the angle of incline of each recess of a segment, the angle of incline of the first surface of a segment adjacent an end surface of an end section of a segment whose cutout is adjacent that recess and the angle of incline of the end of a key adjacent that recess are equal.

11. An assembly in accordance with claim 10, wherein the angle of incline of each recess is in a range from 10-30 degrees.

12. An assembly in accordance with claim 10, wherein: each segment has opposing third and fourth surfaces joining the first and second surfaces; the cutout in each segment is spaced from the third and fourth surfaces of the segment; the edges of the first surface meeting the third and fourth surfaces of a segment are beveled; the edges of the first surface meeting each end surface of the first and second end portions of a segment are beveled; and the edges of the third and fourth surfaces meeting the end surface of one or more of the first and second end sections of a segment are beveled.

13. An assembly in accordance with claim 12, wherein the angle of incline of each recess is in a range from 10-30 degrees and the angle of each bevel is in a range from 35-60 degrees.

14. An assembly in accordance with claim 7, wherein said plurality of segments include: first set of horizontally disposed segments; a second set of horizontally disposed segments vertically spaced from said first set of horizontally disposed segments; a first set of vertically disposed segments; and a second set of vertically disposed segments horizontally spaced from the first set of vertically disposed segments; a first end segment of said first horizontally disposed set of segments abutting a first end segment of said first set of vertically disposed segments; a second end segment of said first set of horizontally disposed segments abutting a first end segment of said second set of horizontally disposed segments; a first end segment of said second set of horizontally disposed segments abutting a second end segment of said first set of vertically disposed segments; and a second end segment of said second set of horizontally disposed segments abutting a second end segment of the second set of vertically disposed segments.

15. An assembly in accordance with claim 14, wherein each of the first and second end segments of said first set of horizontally disposed segments and each of said first and second end segments of said second set of horizontally disposed segments has a first part of an end portion which extends vertically to abut the respective vertically disposed segment; and each of the first and second end segments of said first set of horizontally disposed segments has a extension part of said end portion having said first part which extends vertically opposite to said first part.

16. An assembly in accordance with claim 7, wherein each cutout is part oblong in shape and each said key is oblong in shape.

17. An assembly in accordance with claim 1, further comprising: a fuel cell stack having a stack face; a manifold abutting said stack face, said dielectric frame being situated between said manifold and said stack face.

18. An assembly in accordance with claim 17, further comprising: a gasket situated between said frame and said face of said stack; and at least a further gasket situated between said frame and said manifold.

19. An assembly in accordance with claim 18, wherein: said manifold includes a plurality of pins distributed about the periphery of the manifold; said further gasket includes a plurality of through apertures aligned with said pins and through which said pins pass; and said segments include apertures aligned with and receiving said pins.

20. An assembly in accordance with claim 19, wherein each of said pins has at the upper end of the pin opposing surfaces which slant into the thickness of the body of the pin and then extend upright to the end surface of the pin.

21. An assembly in accordance with claim 20, wherein the length of said pins is less than the length of the apertures of said segments receiving said pins.

22. An assembly in accordance with claim 20, wherein each of said pins
has a cylindrical body and said end surface is oblong.

23. An assembly comprising:
a manifold including one or more pins distributed about the periphery of said manifold, each of said pins having at the upper end of the pin opposing surfaces which slant into the thickness of the body of the pin and then extend upright to the end surface of the pin.

24. An assembly in accordance with claim 23, wherein each of said pins has a cylindrical body and said end surface is oblong.

25. An assembly in accordance with claim 24, wherein the rounded edges of said oblong end surface are beveled.

26. An assembly in accordance with claim 23, wherein said manifold further includes a manifold body and a rail assembly attached to the periphery of said body and from which said pins extend.

27. An assembly in accordance with claim 26, wherein said rail assembly includes a first side and a second side opposing said first side, and an third side and a fourth side opposing said third side, wherein said first and second sides connect with said third and fourth sides to form a frame, and wherein said first and second sides extend beyond said fourth side to form extensions.

28. An assembly in accordance with claim 27, wherein each of said extensions slidably supports a pin.

29. An assembly in accordance with claim 28, wherein each of said extensions includes a notch in which the pin is slidably held.

30. An assembly in accordance with claim 29, wherein said body has a plurality of pan sections separated by compound folds, and said rail assembly has kerfs in said rail assembly in line with the compound folds.

31. An assembly in accordance with claim 23, wherein the angle of said slant is in a range of 10-60 degrees.

32. An assembly in accordance with claim 23, wherein said manifold includes one or more further pins situated along the periphery of said manifold which are oblong in shape.

33. An assembly in accordance with claim 32, wherein each of said further pins has a full cylindrical untapered body.

34. An assembly comprising:
a dielectric frame having a plurality of apertures distributed about the periphery of said dielectric frame;
an insert in one or more of said apertures, each insert comprising a dielectric body configured to receive and partially surround a member to be inserted in the corresponding aperture,
wherein said dielectric body has a slot running along the length of said body from a first end of said body toward a second end of said body opposing said first end, said slot is of constant width for a first distance and then widens in funnel shape.

35. An assembly in accordance with claim 34, wherein said dielectric body comprises mica.

36. An assembly in accordance with claim 34, wherein said dielectric body comprises an elongated shell having an opening at said first end facing outward of the corresponding aperture.

37. An assembly in accordance with claim 36, wherein said slot runs along the length of said shell from said opening at said first end of said elongated shell toward said second end of said elongated shell.

38. An assembly in accordance with claim 37, wherein said elongated shell has an opening at a second end of said elongated shell opposing said first end.

39. An assembly in accordance with claim 38, wherein said elongated shell is one of circular cylindrical and oblong in shape.

40. An assembly in accordance with claim 37, wherein said elongated shell has a second end opposing said first end which is closed and rounded.

41. An assembly in accordance with claim 40, wherein said elongated shell has further opposed openings in opposing side wall portions of said closed and rounded second end.

42. An assembly in accordance with claim 41, wherein one of said further openings communicates with said slot.

43. An assembly in accordance with claim 42, wherein said elongated shell is one of circular cylindrical and oblong in shape.

44. An insert comprises a dielectric body formed as an elongated shell having an opening at a first end and a second opposing end which is one of open and closed and rounded, wherein said elongated shell has a slot running along the length of said shell from said opening at said first end of said shell toward said second end of said shell opposing said first end and said slot is of constant width for a first distance and then widens in funnel shape.

45. An insert in accordance with claim 44, wherein said elongated shell is one of circular cylindrical and oblong in shape.

46. An insert in accordance with claim 44, wherein said elongated shell has closed and rounded second end and further opposed openings in opposing side wall portions of said closed rounded second end.

47. An assembly in accordance with claim 46, wherein one of said further openings communicates with said slot.

48. An assembly in accordance with claim 44, wherein said dielectric body comprises mica.

* * * * *